United States Patent [19]

Pampouchidis

[11] 4,035,523
[45] July 12, 1977

[54] PROCESS FOR PRODUCING IMPROVED COATING COMPOSITIONS

[76] Inventor: Georgios (Georg) Pampouchidis, 31, Obere Teichstrasse, A-8010 Graz, Austria

[21] Appl. No.: 684,193

[22] Filed: May 7, 1976

[30] Foreign Application Priority Data

May 7, 1975 Austria .............................. 3521/75

[51] Int. Cl.² .................... B05D 3/06; C08F 8/00
[52] U.S. Cl. ........................... 427/44; 204/159.14; 204/159.15; 204/159.19; 204/159.22; 260/836; 260/837 R
[58] Field of Search ............... 427/44; 204/159.19, 204/159.14; 260/837 R, 836

[56] References Cited

U.S. PATENT DOCUMENTS

| | | | |
|---|---|---|---|
| 3,367,992 | 2/1968 | Bearden | 260/837 R |
| 3,373,221 | 3/1968 | May | 260/837 R |
| 3,560,237 | 2/1971 | Miller | 204/159.19 X |
| 3,632,861 | 1/1972 | Hargis | 260/837 R |
| 3,634,542 | 1/1972 | Dowd et al. | 260/837 R |
| 3,683,045 | 8/1972 | Baldwin | 260/837 R |
| 3,697,312 | 10/1972 | Johnson et al. | 260/837 R X |
| 3,776,889 | 12/1973 | Pande et al. | 204/159.14 X |

*Primary Examiner* — John C. Bleutge
*Assistant Examiner* — Thurman K. Page
*Attorney, Agent, or Firm* — A. W. Breiner

[57] ABSTRACT

Coating compositions, primarily for curing by electron beams, are prepared by a process characterized in that from about 1 mole of a non-aromatic cyclic dicarboxylic acid anhydride is reacted at from about 80°–90° C. with from about 1 mole of a monohydroxyalkyl(meth-)acrylate having from about 2 to 12 C-atoms in the alkyl radical, until substantially the acid value of the semi-ester is reached. The resultant semi-ester is reacted at from about 90°–100° C. with a diepoxide, optionally using esterification catalysts and polymerization inhibitors, until an acid value of below about 5 mg KOH/g is obtained. The reaction product obtained is thereafter reacted at from about 70°–80° C. with from about 5–90 mole percent, preferably 20 to 50 mole percent, calculated on the hydroxy groups present, with an unsaturated monoisocyanate having the formula

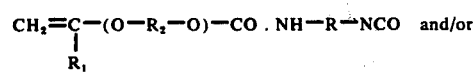 and/or

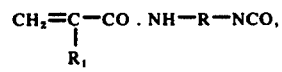

wherein R is an aromatic, aliphatic or cycloaliphatic radical, $R_1$ is hydrogen or $CH_3$, and $R_2$ is a straight chain or branched hydrocarbon radical having from about 2 to 12 C-atoms, until an isocyanate value of substantially zero is obtained. The reaction product can, optionally, be dissolved with one or more polymerizable monomers. The coating compositions, when applied as a film and cured by electron beams using low doses of irradiation give films with excellent resistance to chemicals and weather, having high surface hardness and excellent flexibility.

10 Claims, No Drawings

PROCESS FOR PRODUCING IMPROVED COATING COMPOSITIONS

FIELD OF INVENTION

The present invention relates to a process for producing improved coating compositions curable to electron beams which exhibit, after curing, extraordinary flexibility despite having high surface hardness.

BACKGROUND AND PRIOR ART

U.S. Pat. No. 3,367,992 describes polymerizable systems prepared from diepoxides and maleic anhydride semiesters with hydroxymethacrylates. The systems are cured with peroxides and are useful in the manufacturing of laminates or plastics. Similar systems are disclosed for use as electron beam curable binders in Deutsche Offenlegungsschrift No. 1,916,500. It is a serious disadvantage of these coating compositions that even with a high dosage of electron beams, the cured surface is very soft owing to the open chain portion of maleic acid and hydroxy(meth)acrylate respectively. This disadvantage occurs although the double bond of maleic acid is an additional crosslinking site on irradiation. The resulting higher crosslinking density has a negative influence on film flexibility.

Deutsche Offenlegungsschrift No. 2,221,091 and U.S. Pat. No. 3,683,045 disclose similar systems and state that the storage stability of the resin solution can be enhanced through addition of phenothiazine. The disadvantages of such systems as described above remain unmentioned.

Deutsche Offenlegungsschrift No. 2,164,386 describes the preparation of electron beam curable coating compositions through reaction of diepoxides with acrylic acid and subsequent reaction with diisocyanates. It is an essential property of such systems that, owing to the very small molecule obtained from the diepoxide and acrylic acid reaction, on irradiation hard but brittle films are obtained due to the high crosslinking density. When using high molecular diepoxides in order to reduce the number of double bonds, the high viscosity of such products is a disadvantage. In such case, strong dilution with monomers is necessary, which, in turn, adverssely influences the curing dose needed and film properties of te cured film. If, in variation of the above method, aliphatic diepoxides are used, the cured films, in addition, have a very low surface hardness. The presence of a great number of carboxy groups furthermore leads to insufficient chemical resistance and weather resistance.

A further disadvantage of the products of Deutsche Offenlegungsschrift No. 2,164,386 is that the reaction with the diisocyanates leads to an increase in the size of the molecule which entrains a reduction of polymerization capacity, since the number of double linkages per weight unit becomes lower. In addition, there is the hazard of premature gelation, since each molecule of diisocyanate is able to link two polycondensate chains by reaction with each 2 hydroxy or carboxy groups.

THE INVENTION AND GENERAL DESCRIPTION

It has now been found that with the present invention the above-mentioned disadvantages of prior systems can be substantially or completely eliminated. The coating compositions of the present invention cure with low doses of irradiation to give films with excellent resistance to chemicals and weather and surprisingly, despite very high surface hardness, exhibit excellent flexibility.

The invention is directed to a process for producing, and to improved coating compositions, curable with electron beams, characterized in that from about 1 mole of a non-aromatic cyclic dicarboxylic acid anhydride is reacted at from about 80° – 90° C. with from about 1 mole of a monohydroxyalkyl(meth)acrylate having from about 2 to 12 C-atoms in the alkyl radical, until substantially the acid value of the semiester is reached. The resultant semiester is reacted at from about 90° – 100° C. with a diepoxide, optionally using esterification catalysts and polymerization inhibitors, until an acid value of below about 5 mg KOH/g is obtained. The reaction product obtained is thereafter reacted at from about 70° – 80° C. with from about 5 – 90 mole percent, preferably 20 to 50 mole percent, calculated on the hydroxy groups present, with an unsaturated monoisocyanate having the formula

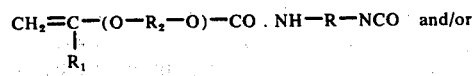

and/or

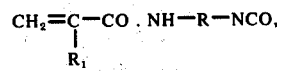

wherein R is an aromatic, aliphatic or cycloaliphatic radical, $R_1$ is hydrogen or $CH_3$, and $R_2$ is a straight chair r branched hydrocarbon radical having from about 2 to 12 C-atoms, until an isocyanate value of substantially zero is obtained. The reaction product can, optionally, be dissolved with one or more polymerizable monomers.

It is a primary advantage of the present coating compositions that, due to the relatively high molecular weight of the semiesters employed, a linear increase of molecular weight with uniform structure of the molecules of the diepoxide of from about twice to about four times its initial value is realized. The uniform molecular structure, on the one hand, exerts a positive effect on the mechanical properties of the coatings and, on the other hand, enhances resistance to chemicals.

A further advantage of the coating compositions disclosed herein is that they are constructed in order that they carry polymerizable double bonds at the chain ends, the number of double bonds being about 2 per 1,000 molecular weight units. Thus, on irradiation, crosslinking at the chain ends (and not in statistic distribution) is ensured. This apparently explains the excellent flexibility of the cured films, despite the high surface hardness which is due to the "constituents" of the semiester.

In preparing the semiesters, substantially equivalent quantities of dicarboxylic acid anhydride and monohydroxyalkyl(meth)acrylate are kept at from about 80° – 90° C., while stirring, until the theoretical acid value of the semiester is attained. Suitable, but non-limiting, non-aromatic cyclic dicarboxylic acid anhydrides are hexahydrophthalic anhydride, tetrahydrophthalic anhydride, hexachlorophthalic anhydride, endomethylenehexahydrophthalic anhydride, and decalinedicarboxylic acid anhydride. Monohydroxyalkyl(meth)acrylates having from about 2 to 12 C-atoms in the alkyl radical suitable for esterification with the dicarboxylic acid anhydrides are exemplified by hydroxyethyl)meth(acrylate, hydroxypropyl(meth)acrylate, hydroxybutyl(meth)acrylate, and tripropyleneglycolmono(meth)acrylate. Suitable diepoxides are the commercially aliphatic or cycloaliphatic or aromatic substituted or non-substituted epoxy resins which are liquid at 50° C. and have an epoxy equivalent of from 100 to about 350. Preferred epoxy resins are those based on Bisphenol A, i.e., 2,2-bis(4-hydroxyphenyl)-propane. Suitable unsaturated monoisocyanates having the formula

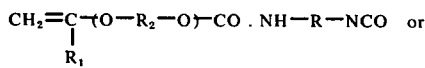

or

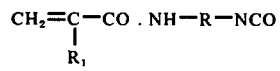

wherein R is an aromatic, aliphatic or cycloaliphatic radical, $R_1$ is hydrogen or $CH_3$, and $R_2$ is a straight chain or branched hydrocarbon radical having from about 2 to 12 C-atoms, are reaction products of diisocyanates with (meth) acrylic acid or hydroxyalkyl esters of acrylic or methacrylic acid, e.g. hydroxyethyl(meth)acrylate, hydroxypropyl(meth)acrylate, and hydroxybutyl(meth)acrylate. Cycloaliphatic diisocyanate starting materials are preferred, such as isophorone diisocyanate or cyclohexane diisocyanate. In preparing these unsaturated monoisocyanates, substantially equimolar proportions of diisocyanates and (meth)acrylic acid are reacted such that one isocyanate group remains free. The reaction is carried out at 40° – 70° C. while stirring, preventing access of moisture, until the theoretical isocyanate value is obtained. A suitable "solvent," as used herein, is a polymerizable monomer, preferably one that has no aromatic nuclei, e.g. acrylic acid or methacrylic acid, their alkyl or oxyalkyl esters having from about 2 to 12 C-atoms in the alkyl radical, poly(meth)-acrylates, e.g., 1,3- or 1,4-butanedioldi(meth)acrylate, diethyleneglycoldi(meth)acrylate, neopentylglycoldi(meth)acrylate, trimethylolpropanetri(meth)acrylate, or pentaerythritetetra(meth)acrylate.

The coating compositions of the invention are prepared as follows. In a first reaction step the diepoxide is reacted with a substantially equivalent amount of the semiester at from about 90° – 100° C., until an acid value of below about 5 mg KOH/g is obtained, optionally co-employing esterification catalysts and polymerization inhibitors. In a next reaction step, the obtained product is reached at from about 70° – 80° C. with from about 5 – 90 mole percent, preferably 20 – 50 mole percent, calculated on the hydroxy groups in the unsaturated isocyanate containing intermediate, until the isocyanate value has fallen to substantially zero. The products obtained are either used undiluted, i.e., 100 percent concentration, or, preferably are dissolved in one or more polymerizable monomers to a solids content of from about 60 to 90 percent. The coatings are applied to a substrate as a film and irradiated.

The coating compositions of the invention can be used as such or in combination with pigments, extenders, or dyestuffs. Suitable substrates are metal, glass, ceramics, or heat-sensitive materials such as plastics, wood, rubber, or paper.

The coating compositions of the invention are cured with energy-rich radiation, preferably from accelerated electrons with at least 100 kV, preferably 300 – 500 kV. Irradiation can be carried out at atmospheric conditions, but preferably in an inert gas atmosphere.

The following examples illustrate the presently preferred embodiments of the invention without limiting the scope thereof. Parts are by weight unless otherwise stated.

Preparation of the unsaturated semiesters 1 mole each of dicarboxylic acid anhydride and of hydroxyalkyl(meth)acrylate are charged to a reaction vessel and cautiously heated to about 85° – 90° C. This temperature is held, while the blend is stirred, until the theoretical acid value for the semiester is attained. Semiester formation under the stated conditions takes about 1 to 2 hours.

Semiester I: hexahydrophthaltic anhydride and hydroxyethylmethacrylate
Semiester II: hexahydrophthalic anhydride and hydroxypropylacrylate
Semiester III: tetrahydrophthalic anhydride and hydroxyethylmethacrylate
Semiester IV: tetrahydrophthalic anhydride and 4-hydroxy-butylacrylate.

Preparation of the unsaturated isocyanate containing intermediate products 1 of diisocyanate is charged to a suitable reaction vessel and heated to about 40° C. During 1 hour, 1 mole of monomer is added continuously, while the batch is stirred and access of moisture is prevented. Then the batch is heated to 70° C. and stirred until after about 1 hour the theoretical isocyanate value is obtained.

Intermediate Product

A: 130 g hydroxyethylmethacrylate + 222 g isophoronediisocyanate
B: 130 g hydroxypropylacrylate + 222 g isophoronediisocyanate
C: 144 g 4-hydroxybutylacrylate + 222 g isophoronediisocyanate
D: 72 g acrylic acid + 222 g isophoronediisocyanate
E: 130 g hydroxyethylmethacrylate + 168 dg hexamethylenediisocyanate Each of the reaction products made from the stated reactants and under the stated conditions will contain substantially 1 mole free isocyanate group.

EXAMPLE 1

360 g of an epoxy resin based on Bisphenol A, with an epoxy equivalent of 172 – 178 (Epoxy Resin 1) are reacted at about 95° – 100° C. with 568 g of Semiester I, coemploying 0.4 g of hydroquinone and 0.5 g of triethyl amine. After 4 to 5 hours the reaction product will have an acid value of about 1 – 2 mg KOH/g. The batch is cooled and dissolved to 80 percent solids with a 1:1 blend of n-butylacrylate and 1,4-butanedioldimethacrylate to a solids content of 80 percent (Resin Solution 1).

250 g of this Resin Solution 1 are blended with 62.5 g of an 80 percent solution in n-butylacrylate/1,4-butanedioldimethacrylate (1:1) of Intermediate Product A and held at 80° C. while stirring and preventing access of moisture. After 2 to 3 hours the reaction product has an NCO-value of substantially zero (0) (Coating Composition 1).

EXAMPLE 1 a

Same as Example 1, with the exception that Intermediate Product B is used (Coating Composition 1a).

EXAMPLE 2

360 g of epoxy resin 1 (Example 1) are reacted at 95° – 100° C. with 568 g of Semiester II, coemploying 0.4 g of hydroquinone and 0.5 g of triethylamine. After 4 to 5 hours, the reaction product will have an acid value of from about 1 – 2 mg KOH/g. The batch is cooled and dissolved with a 1:1 blend of n-butylacrylate and 1,4-butanedioldimethacrylate to a solids content of 80 percent (Resin Solution 2).

250 g of Resin Solution 2 are blended with 62.5 g of an 80 percent solution in n-butylacrylate/1,4-butanedioldimethacrylate (1:1) of Intermediate Product A and held at 80° C. while stirring and preventing access of moisture. After 2 to 3 hours the reaction product has an NCO-value of substantially zero (Coating Composition 2).

EXAMPLE 2 a

Same as Example 2, except that 70 g of Intermediate Product C is employed (Coating Composition 2a).

EXAMPLE 3

360 g of epoxy resin 1 (Example 1) are reacted at 95° – 100° C. with 564 g of Semiester III, coemploying 0.4 g of hydroquinone and 0.5 g of triethylamine. After 4 to 5 hours the reaction product will have an acid value of from about 1 – 2 mg KOH/g. The batch is cooled and dissolved with a 1:1 blend of n-butylacrylate and 1,4-butanedioldimethacrylate to a solids content of 80 percent (Resin Solution 3).

250 g of Resin Solution 3 are blended with 62.5 g of an 80 percent solution in n-butylacrylate/1,4-butanedioldimethacrylate (1:1) of Intermediate Product A and held at 80° C. while stirring and preventing access of moisture. After 2 to 3 hours the reaction product has an NCO-value of substantially zero (Coating Composition 3).

EXAMPLE 3 a

Same as Example 3, except that 45 g of Intermediate Product D is used (Coating Composition 3a).

EXAMPLE 4

360 g of epoxy resin 1 (Example 1) are reacted at 95° – 100° C. with 592 g of Semiester IV, coemploying 0.4 g of hydroquinone and 0.5 g of triethylamine. After 4 to 5 hours the reaction product will have an acid value of from 1 – 2 mg KOH/g. The batch is cooled and dissolved with a 1:1 blend of n-butylacrylate and 1,4-butanedioldimethacrylate to a solids content of 80 percent (Resin Solution 4).

250 g of Resin Solution 4 are blended with 62.5 g of an 80 percent solution in n-butylacrylate/1,4-butanedioldimethacrylate (1:1) of Intermediate Product B and held at 80° C. while stirring and preventing access of moisture. After 2 to 3 hours the reaction product has an NCO-value of substantially zero (Coating Composition 4).

EXAMPLE 4 a

Same as Example 4, except that 70 g of Intermediate Product C is employed (Coating Composition 4a).

EXAMPLE 4 b (Paint)

42 g of titanium dioxide (Rutil type) are milled with 50 g of a 40 percent solution of coating composition 4a in n-butylacrylate/1,4-butanedioldimethacrylate (1:1). 40 g of coating composition 4a are added. The paint has a solids content of 74 percent (Coating Composition 4b).

EXAMPLE 5

500 g of an epoxy resin based on Bisphenol A with an epoxy equivalent of 230 to 250 (Epoxy Resin 2) are reacted at 95° – 100° C. with 568 g of Semiester I, coemploying 0.5 g of hydroquinone and 0.8 g of triethylamine. After 5 to 6 hours the reaction product will have an acid value of 2 to 3 mg KOH/g. The batch is cooled and diluted to 75 percent of solids with n-butylacrylate (Resin Solution 5).

267 g of Resin Solution 5 are blended with 66.7 g of a 75 percent solution of Intermediate Product A in n-butylacrylate and held at 80° C. while stirring and preventing access of moisture. After 2 to 3 hours the reaction product has an NCO-value of substantially zero (Coating Composition 5).

EXAMPLE 5 a

Same as Example 5, except that 66.7 g of a 75 percent solution of Intermediate Product B in n-butylacrylate is used (Coating Composition 5a).

EXAMPLE 5 b

Same as Example 5, except that 53.3 g of a 75 percent solution of Intermediate Product E in n-butylacrylate is used (Coating Composition 5b).

EXAMPLE 6

500 g of epoxy resin 2 (Example 5) are reacted at 95° – 100° C. with 568 g of Semiester II, coemploying 0.5 g of hydroquinone and 0.8 g of triethylamine. After 5 to 6 hours the reaction product will have an acid value of about 2 to 3 mg KOH/g. The batch is cooled and diluted to 75 percent of solids with n-butylacrylate (Resin Solution 6).

267 g of Resin Solution 6 are blended with 66.7 g of a 75 percent solution of Intermediate Product A in n-butylacrylate and held at 80° C. while stirring and preventing access of moisture. After 2 to 3 hours the reaction product has an NCO-value of substantially zero (Coating Composition 6).

EXAMPLE 6 a

Same as Example 6, except that 74.5 g of a 75 percent solution of Intermediate Product C in n-butylacrylate is used (Coating Composition 6a).

EXAMPLE 6 b

Same as Example 6, except that 53.3 g of a 75 percent solution of Intermediate Product E is used (Coating Composition 6b).

EXAMPLE 7

400 g of an aliphatic epoxy resin with an epoxy equivalent of 175 – 205 (Epoxy Resin 3) are reacted at 95° – 100° C. with 568 g of Semiester I, coemploying 0.5 g of hydroquinone and 0.7 g of triethylamine. After 4 to 5 hours the reaction product will have an acid value of 1 to 2 mg KOH/g. The batch is cooled and diluted to 90 percent solids with 1,4-butanedioldimethacrylate (Resin Solution 7).

222 g of Resin Solution 7 are mixed with 55.6 g of a 90 percent solution in 1,4-butanedioldimethacrylate of Intermediate Product A and held at 80° C. while stirring. After 2 to 3 hours the reaction product has an NCO-value of substantially zero (Coating Composition 7).

EXAMPLE 7 a

Same as Example 7, except that a solution of Intermediate Product B is used (Coating Composition 7a).

EXAMPLE 8

400 g of epoxy resin 3 (Example 7) are reacted at 95° − 100° C. with 564 g of Semiester III, coemploying 0.5 g of hydroquinone and 0.7 g of triethylamine. After 4 to 5 hours the reaction product will have an acid value of 1 − 2 mg KOH/g. The batch is cooled and diluted to 90 percent solids with 1,4-butanedioldimethacrylate (Resin Solution 8).

222 g of Resin Solution 8 are mixed with 55.6 g of a 90 percent solution in 1,4-butanedioldimethacrylate of Intermediate Product A and held at 80° C. while stirring. After 2 to 3 hours the reaction product has an NCO-value of substantially zero (Coating Composition 8).

EXAMPLE 8 a

Same as Example 8, except that a solution of Intermediate Product B is used (Coating Composition 8a).

EXAMPLE 9

(Comparison Example according to Deutsche Offenlegungsschrift No. 1,916,500)

360 g of epoxy resin 1 (Example 1) are reacted at 90° to 100° C. with 232 g of hydroxyethylacrylate and 196 g of maleic anhydride, coemploying 0.4 g of hydroquinone and 0.5 g of triethylamine. After 8 hours the reaction product has an acid value of 5 mg KOH/g. The batch is cooled and diluted to 80 percent solids with n-butylacrylate (Coating Composition 9).

EXAMPLE 10

(Comparison Example according to Deutsche Offenlegungsschrift No. 2,164,386)

360 g of epoxy resin 1 (Example 1) and 144 g of acrylic acid are reacted at 95° − 110° C., coemploying 0.4 g of hydroquinone and 0.5 g of triethylamine. After 7 hours, the reaction product has an acid value of 5 mg KOH/g. The batch is cooled and diluted to 80 percent solids with n-butylacrylate. Then at 80° C., in the course of 2 hours, 84 g of hexamethylenediisocyanate, 80 percent in n-butylacrylate are added. The reaction mass is held at 80° C. for 5 hours, until an NCO-value of 1 percent is obtained. The reaction product has such a high viscosity that it cannot be applied. It is further diluted to 60 percent solids with n-butylacrylate (Coating Composition 10).

IRRADIATION CONDITIONS

The coating compositions prepared according to the above examples are applied at a film thickness of 60 μ to degreased aluminum panels and are irradiated by an electron beam in an inert atmosphere (mixture of nitrogen and carbon dioxide). An accelerator voltage of 500,000 V and an amperage of 23 mA is used. The panels are continuously irradiated twice with various radiation doses. The films of the above coating compositions, made according to this invention, cure with 1 − 5 Mrad and shown very high surface hardness, flexibility, and resistance to acetone.

The results of evaluation obtained with a total radiation dose of 3 Mrad are tabulated in the following table.

TABLE

| Coating Composition | Pendulum Hardness | Acetone Resistance | Erichsen-Indentation |
| --- | --- | --- | --- |
| 1 | 200 s | >180 s | 6.9 mm |
| 1 a | 195 s | >180 s | 7.1 mm |
| 2 | 195 s | >180 s | 7.0 mm |
| 2 a | 190 s | >180 s | 7.2 mm |
| 3 | 195 s | >180 s | 7.1 mm |
| 3 a | 190 s | 180 s | 6.6 mm |
| 4 | 195 s | >180 s | 7.2 mm |
| 4 a | 190 s | >180 s | 7.4 mm |
| 4 b | 210 s | >180 s | 6.8 mm |
| 5 | 200 s | >180 s | 6.8 mm |
| 5 a | 195 s | >180 s | 6.9 mm |
| 5 b | 175 s | >180 s | 7.1 mm |
| 6 | 195 s | >180 s | 6.8 mm |
| 6 a | 190 s | >180 s | 7.0 mm |
| 6 b | 170 s | >180 s | 7.1 mm |
| 7 | 165 s | >180 s | 7.4 mm |
| 7 a | 160 s | >180 s | 7.5 mm |
| 8 | 165 s | >180 s | 7.5 mm |
| 8 a | 160 s | >180 s | 7.7 mm |
| 9 (Comp. Ex) | 80 s | 70 s | 2.1 mm |
| 10 (Comp. Ex) | 105 s | 55 s | 1.8 mm |

Key to Table:
Pendulum Hardness: Konig DIN 53 157
Acetone Resistance: seconds contact with acetone, until the film swells. Max. time observed: 180 seconds
Erichsen Indentation: DIN 53 156 (60 μm film thickness)

As will be apparent to one skilled in the art, various modifications can be made within the scope of the aforesaid description. It is possible to modify the constituents and the temperatures of reaction provided they fall within the critical definitions set forth in the specification. Moreover, it is possible to modify the coating compositions in known manner by inclusion of conventional additives for their intended purposes. These modifications being within the ability of one skilled in the art form a part of the present invention and are embraced by the appended claims.

It is claimed:

1. Process for producing improved coating compositions curable by electron beams whereby
   a. about 1 mole of a non-aromatic cyclic dicarboxylic acid anhydride is reacted at from about 80° − 90° C. with from about 1 mole of a monohydroxyalkyl(meth)acrylate having from about 2 to 12 C-atoms in the alkyl radical, until substantially the acid value of the semiester is reached,
   b. the semiester of (a) is reacted at from about 90° − 100° C. with a diepoxide until an acid value of below about 5 mg KOH/g is obtained, and
   c. the reaction product of (b) is reacted at from about 70° − 80° C. with from about 5 − 90 mole percent calculated on the hydroxy groups present with at least one unsaturated monoisoyanate of the general formula selected from the group consisting of

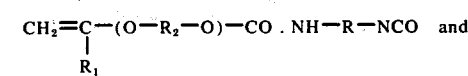

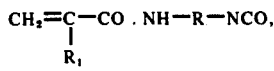

wherein R is an aromatic, aliphatic or cycloaliphatic radical, $R_1$ is hydrogen or $CH_3$, and $R_2$ is a straight chain or branched hydrocarbon radical having from about 2 to 12 C-atoms, until an isocyanate value of substantially zero is obtained.

2. Process of claim 1 wherein (b) the mole percent is from 20 to 50 mole percent.

3. Process of claim 1 further including dissolving composition (c) in at least one polymerizable monomer.

4. Process of claim 1 wherein in (a) the anhydride is selected from the group consisting of hexahydrophthalic anhydride, tetrahydrophthalic anhydride, hexachlorophthalic anhydride, endomethylenehexahydrophthalic anhydride, and decalinedicarboxylic acid anhydride.

5. Process of claim 1 wherein in (a) the acrylate is selected from the group consisting of hydroxyethyl(-meth)acrylate, hydroxypropyl(meth)-acrylate, hydroxybutyl(meth)acrylate, and tripropyleneglycolmono(-meth)-acrylate.

6. Process of claim 1 wherein in (b) the diepoxide is a liquid diepoxide having an epoxide equivalent of from about 100 to 350 and is based on Bisphenol A.

7. Process of claim 1 wherein in (c) the monoisocyanate is isophorone diisocyanate or cyclohexane diisocyanate.

8. The coating composition made by the process of claim 1.

9. The coating composition made by the process of claim 3.

10. Process of claim 1 including the steps of applying (c) to a substrate as a film and curing said film with an electron beam.

* * * * *